United States Patent
Kuppens et al.

(10) Patent No.: US 7,839,932 B2
(45) Date of Patent: Nov. 23, 2010

(54) METHOD AND APPARATUS FOR ENCODING OR DECODING TWO DIGITAL VIDEO SIGNALS ARRANGED IN A SINGLE-VIDEO SIGNAL PATH

(75) Inventors: Chris Kuppens, Oosterhout (NL); Jeroen Rotte, Breda (NL); Jan van Rooy, S'Hertogenbosch (NL)

(73) Assignee: Thomson Licensing, Boulogne-Billancourt (FR)

( * ) Notice: Subject to any disclaimer, the term of this patent is extended or adjusted under 35 U.S.C. 154(b) by 1405 days.

(21) Appl. No.: 11/283,378

(22) Filed: Nov. 18, 2005

(65) Prior Publication Data

US 2007/0116114 A1  May 24, 2007

(30) Foreign Application Priority Data

Dec. 6, 2004 (EP) .................................. 04292882
Sep. 1, 2005 (EP) .................................. 05090251

(51) Int. Cl.
*H04N 11/04* (2006.01)
*G06K 9/36* (2006.01)
(52) U.S. Cl. .................................. 375/240.23; 382/232
(58) Field of Classification Search ......... 382/232–251; 375/240.02–240.29; 348/14.01, 14.13, 207.99, 348/211.5; 725/127
See application file for complete search history.

(56) References Cited

U.S. PATENT DOCUMENTS 5,157,656 A  10/1992  Turudic et al.
6,009,305 A  12/1999  Murata
6,345,390 B1 *  2/2002  Eto et al. ..................... 725/127
7,564,484 B2 *  7/2009  Rotte et al. ............... 348/211.1
2003/0142869 A1 *  7/2003  Blaettermann et al. ...... 382/232

FOREIGN PATENT DOCUMENTS

DE  32 30 270 A1  2/1984
EP  0 740 469  10/1996
EP  0 848 517 A1  6/1998
EP  0 926 898 A1  6/1999

OTHER PUBLICATIONS

Abstracts of JP Pub. No. 2000333168, published on Nov. 30, 2000.
European Search Report for EP04292882, dated Apr. 19, 2005.

* cited by examiner

*Primary Examiner*—Duy M Dang
(74) *Attorney, Agent, or Firm*—Robert D. Shedd; Robert B. Levy

(57) ABSTRACT

In high-end professional video cameras, a triax system transfers various signals back and forth over a single coaxial cable between the camera and a base unit using frequency multiplexing. Current low-cost camera systems transfer several signals as analogue signals over separate wires or cables. However, a standard serial SDI signal from the camera to a base unit replaces the analogue camera CVBS video output signal achieving a maximum data rate of 270 Mbit/s. To improve efficiency, a single SDI or HDSDI connection transmits a digital playback video signal as well as a digital teleprompter video signal from the base unit to the camera. A one-dimensional adaptive dynamic range compression reduces the data word length of the two video signals transmitted via the SDI/HDSDI connection. A smaller data word length is assigned to one of the two video signals than to the data word length of the other one.

38 Claims, 7 Drawing Sheets

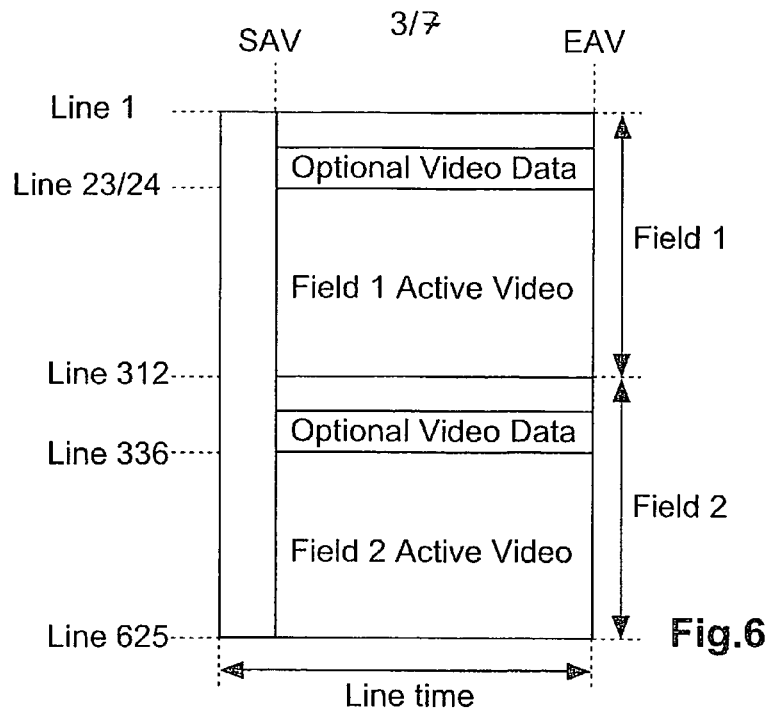

picture_in :="/Pictures/Totaltest_BnW.bmp"

PICTIN := READBMP(picture_in)

_____ number of bits used for quantisation _____ n :=2

_____ properties of the picture _____

XMAX := cols (PICTIN)

YMAX := rows (PICTIN)

XMAX = 768

YMAX = 768

_____ Crop horizontal resolution to multiples of 16 _____

XMAX := 16 · floor$\left(\dfrac{XMAX}{16}\right)$

XMAX = 768

```
PICTDECOD:= y ← 0
           while y < YMAX
           (x ← 0)
             while x << XMAX
               MIN ← 255
               MAX ← 0
               i ← 0
               while i < 16
                 MIN ← PICTIN_{y,x+1} if PICTIN_{y,x+1} < MIN
                 MAX ← PICTIN_{y,x+1} if PICTIN_{y,x+1} > MAX
                 i ← i+1
               i ← 0
               while i < 16
                 PICTCOD_{y,x+1} ← trunc[[[(PICTIN_{y,x+1} - MIN)·(2^n - 1)] / [MAX - MIN]] + 0.5] if MAX ≠ MIN
                 PICTCOD_{y,x+1} ← 0 if MAX = MIN
                 i ← i + 1
               PICTCOD_{YMAX+y,x} ← MIN
               PICTCOD_{YMAX+y,x+1} ← MAX
               x ← x + 16
             y ← y + 1
           PICTCOD
```

Fig.14

METHOD AND APPARATUS FOR ENCODING OR DECODING TWO DIGITAL VIDEO SIGNALS ARRANGED IN A SINGLE-VIDEO SIGNAL PATH

CROSS REFERENCE TO RELATED APPLICATIONS

This application claims the benefit of the EP Application No. 04292882.0 filed on Dec. 6, 2005 and 05090251.9 filed on Sep. 1, 2005, the disclosure of which is herewith incorporated by reference in its entirety.

FIELD OF THE INVENTION

The invention relates to a method and to an apparatus for encoding or decoding two digital video signals arranged in a single-video signal path, e.g. an SDI or HDSDI format video signal path.

BACKGROUND OF THE INVENTION

In the upper part of the market of professional video cameras a triax system is used for transferring various signals back and forth over a coaxial cable between the camera and a base unit. Transferring multiple signals in different direction over a single cable is feasible because frequency multiplexing is used in which to every type of signal a separate frequency band is assigned.

In the lower part of the market a multi-core adapter solution is currently being used.

In earlier systems all signals were transferred as analogue signals over separate wires or cables. Because no frequency multiplex/de-multiplex is required such solution is much cheaper. However, a disadvantage is that the maximum distance between camera and base unit is restricted to about 100 meters, that the signals on the receiving side need to be equalized and that every additional meter of cable has a negative influence on the signal quality, e.g. the S/N ratio.

In current systems the analogue camera CVBS video output signal (Chroma Video Blanking Signal) is replaced by a standard serial SDI signal (Serial Digital Interface) achieving a maximum data rate of e.g. 270 Mbit/s, 143 Mbit/s, 360 Mbit/s or 540 Mbit/s for SDTV and 1.485 Gbit/s for HDTV over a coaxial cable. The SDI video signal has a word length of 10 bit and a multiplexed 4:2:2 format. Its clock rate is 27 MHz. It is standardized in ANSI/SMPTE 259 M and ANSI/SMPTE 125 M.

At the receiving base unit this SDI signal is re-clocked and/or converted to CVBS format or Y-$C_r$-$C_b$ format. Thereby a degradation of the quality of the CVBS signal can be avoided. All the other signals in the multi-core cable remain in analog format.

SUMMARY OF THE INVENTION

A single SDI or HDSDI (High Definition Serial Digital Interface) connection is designed for carrying a single digital video signal. However, it is desirable to transmit a digital playback video signal as well as a digital teleprompter (TP) video signal from the base unit to a camera.

A problem to be solved by the invention is to provide transmission of two digital video signals, in particular a playback video signal and a teleprompter video signal from a base unit to a professional camera, via a serial video signal connection designed for transmission of a single video signal.

A one-dimensional adaptive dynamic range compression (ADRC) is used to reduce the data word length of the two video signals to be transmitted via the SDI or HDSDI connection. To one of the two video signals (e.g. the teleprompter signal) a smaller data word length can be assigned than to the data word length of the other one (e.g. the playback signal), whereby the MSB bit (most significant bit) of the SDI connection is not used for carrying bits of the two compressed video signals. As an alternative, two compressed video signals having equal word length can be used whereby one video signal occupies the full range of 32 amplitude levels and the other video signal occupies a range of 31 amplitude levels.

Two compressed 8-bit multiplexed 4:2:2 signals are multiplexed into one 10-bit 4:2:2 stream. The ADRC compression is described e.g. in EP-A-0926898 and is a lossy compression which requires low resources only. The compression has a latency of less then 100 clock cycles and has a constant bit rate. The two compressed video streams fit transparently in a standard 270 Mbit/sec serial SDI video data stream. All other or auxiliary data signals like synchronization, data communication, private data, intercom and audio transport are also embedded in the SDI or HDSDI stream.

For compatibility with analogue recording equipment some analogue signals are also present on the adapter VTR plug that is the standard digital multi-core connector.

Only one SDI/HDSDI downstream and one SDI/HDSDI upstream form the link between camera and base unit. The upstream SDI signal contains two video signals, e.g. teleprompter video and playback video. These video signals are send back to the camera. Playback video, also known as external video, can be used by the cameraman for orientation purposes. Teleprompter video is used by news readers for displaying text on a monitor or any other display.

The advantages of the one-dimensional ADRC compression are:
- low latency of less then 100 clock cycles;
- it uses very little resources, i.e. it is a low-cost compression;
- practically or subjectively it has no loss of horizontal and vertical resolution;
- it has a constant bit rate.

A disadvantage is that there is some loss of amplitude resolution.

In principle, the inventive method is suited for encoding a first and a second digital video signal using compression, the samples of each of which have a pre-selected original word length, into a combined video signal the code words of which have a pre-selected main word length that is smaller than two times said original word length, said method including the steps:

from lines of said first and second video signals, successively forming sample blocks for a luminance component and for two different chrominance components of each one of said first and second video signals;
determining the minimum and the maximum amplitude values in a current sample block;
in said current sample block, subtracting said minimum amplitude value from every sample in said current sample block and quantizing the resulting difference values such that the word length of the quantized difference values gets a pre-selected first word length for the quantized difference values of said first video signal and gets a preselected second word length for the quantized difference values of said second video signal, wherein said first and second word lengths can be different, and whereby said quantizing is controlled by the dynamic range value in said current sample block, said dynamic range value representing the difference between said maximum amplitude value and said minimum amplitude value in said current sample block;

assembling, for a current data block of said combined video signal, each quantized difference value of said first and second video signals such that the bits of a quantized difference value of said first video signal form lower bit positions of a data word of said combined video signal and the bits of a corresponding quantized difference value of said second video signal form upper bit positions of a data word of said combined video signal, said upper bit positions being arranged adjacent to said lower bit positions, whereby the bits of the data words for said minimum amplitude value and said dynamic range value of said current data block, or for said minimum amplitude value and said maximum amplitude value of said current data block, each form one bit per data word of said quantized difference values of said first and second video signals;

successively outputting data words assembled in such way as said combined video signal.

In principle, the inventive method is suited for decoding a combined video signal including two compressed video signals into a first and a second digital video signal, the samples of each of which have a pre-selected original word length, whereby the code words of said combined video signal have a pre-selected main word length that is smaller than two times said original word length, said method including the steps:— parsing code words of said combined video signal, so as to regain from pre-selected lower bit positions—representing a first word length of each one of said code words—the bits of quantized difference values of said first video signal and from pre-selected upper bit positions—representing a second word length of corresponding ones of said code words—the bits of corresponding quantized difference values of said second video signal, said upper bit positions being arranged adjacent to said lower bit positions, wherein said first and second word lengths can be different, and to regain data words for a minimum amplitude value and a dynamic range value, or for a minimum amplitude value and a maximum amplitude value, of a current data block of said first and of said second digital video signal, whereby the bits of the data words for said minimum amplitude value and said dynamic range value or said maximum amplitude value, respectively, of said current data block each form one bit per code word of said quantized difference values of said first and second video signals, and whereby said dynamic range value represents the difference between said maximum amplitude value and said minimum amplitude value in said current data block;

in said current data block, inversely quantizing said quantized difference values under control of said dynamic range value and adding said minimum amplitude value to each one of said inversely quantized difference values, whereby the word length of the correspondingly combined values gets said pre-selected original word length for said first video signal and said second video signal;

from successive data blocks, forming and outputting sample words for lines of a luminance component and two different chrominance components of each one of said first and second video signals.

In principle the inventive apparatus is suited for encoding a first and a second digital video signal using compression, the samples of each of which have a pre-selected original word length, into a combined video signal the code words of which have a pre-selected main word length that is smaller than two times said original word length, said apparatus including:

means being adapted for forming successively, from lines of said first and second video signals, sample blocks for a luminance component and for two different chrominance components of each one of said first and second video signals;

means being adapted for determining the minimum and the maximum amplitude values in a current sample block;

means being adapted for subtracting, in said current sample block, said minimum amplitude value from every sample in said current sample block;

means being adapted for quantizing the resulting difference values such that the word length of the quantized difference values gets a pre-selected first word length for the quantized difference values of said first video signal and gets a pre-selected second word length for the quantized difference values of said second video signal, wherein said first and second word lengths can be different, and whereby said quantizing is controlled by the dynamic range value in said current sample block, said dynamic range value representing the difference between said maximum amplitude value and said minimum amplitude value in said current sample lock;

means being adapted for assembling, for a current data block of said combined video signal, each quantized difference value of said first and second video signals such that the bits of a quantized difference value of said first video signal form lower bit positions of a data word of said combined video signal and the bits of a corresponding quantized difference value of said second video signal form upper bit positions of a data word of said combined video signal, said upper bit positions being arranged adjacent to said lower bit positions, whereby the bits of the data words for said minimum amplitude value and said dynamic range value of said current data block, or for said minimum amplitude value and said maximum amplitude value of said current data block, each form one bit per data word of said quantized difference values of said first and second video signals;

and for successively outputting data words assembled in such way as said combined video signal.

In principle the inventive apparatus is suited for decoding a combined video signal including two compressed video signals into a first and a second digital video signal, the samples of each of which have a pre-selected original word length, whereby the code words of said combined video signal have a pre-selected main word length that is smaller than two times said original word length, said apparatus including:

means being adapted for parsing code words of said combined video signal, so as to regain from pre-selected lower bit positions—representing a first word length of each one of said code words—the bits of quantized difference values of said first video signal and from pre-selected upper bit positions—representing a second word length of corresponding ones of said code words—the bits of corresponding quantized difference values of said second video signal, said upper bit positions being arranged adjacent to said lower bit positions, wherein said first and second word lengths can be different, and to regain data words for a minimum amplitude value and a dynamic range value, or for a minimum amplitude value and a maximum amplitude value, of a current data block of said first and of said second digital video signal, whereby the bits of the data words for said minimum amplitude value and said dynamic range value or said maximum amplitude value, respectively, of said current data block each form one bit per code word of said quantized difference values of said first and second video signals, and whereby said dynamic range value represents the difference between said maximum amplitude value and said minimum amplitude value in said current data block;

means being adapted for inversely quantizing, in said current data block, said quantized difference values under control of said dynamic range value and adding said minimum amplitude value to each one of said inversely quantized difference values, whereby the word length of the correspondingly combined values gets said pre-selected original word length for said first video signal and said second video signal;

means being adapted for forming and outputting, from successive data blocks, sample words for lines of a luminance component and two different chrominance components of each one of said first and second video signals.

BRIEF DESCRIPTION OF THE DRAWINGS

Exemplary embodiments of the invention are described with reference to the accompanying drawings, which show in:

FIG. 6 2-D representation of one complete picture;

FIG. 9 an orientation of two 5-bit compressed-stream data words within data words of a 10-bit stream;

FIG. 10 Y group of values of a data block;

FIG. 11 C group of values of a data block;

FIG. 14 compression steps in a program suitable for carrying out the invention;

FIG. 16 example luminance signal in an 8-samples group;

FIG. 17 example luminance signal in an 8-samples group with related quantization thresholds;

FIG. 18 basic ADRC group border arrangement;

FIG. 19 improved ADRC group border arrangement.

DETAILED DESCRIPTION OF PREFERRED EMBODIMENTS

Figure 1:
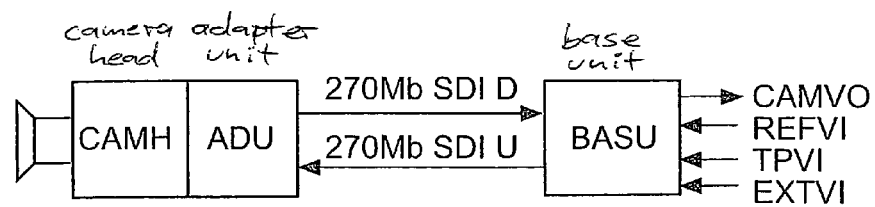
FIG. 1 a camera/base unit system including one SDI downlink and one SDI uplink connection.

In FIG. 1 an adapter unit ADU is attached to a camera head CAMH. A base unit BASU receives a reference video input signal REFVI, a teleprompter video input signal TPVI and has an Extern video in terminal EXTVI for entering auxiliary signals. BASU outputs a camera video output signal CAMVO. The base unit sends to the adapter unit the above-described SDI/HDSDI upstream data stream SDIU carrying TP and Play-back, and receives from the adapter unit an SDI/HDSDI down-stream SDID carrying the camera video signal.

Figure 2:
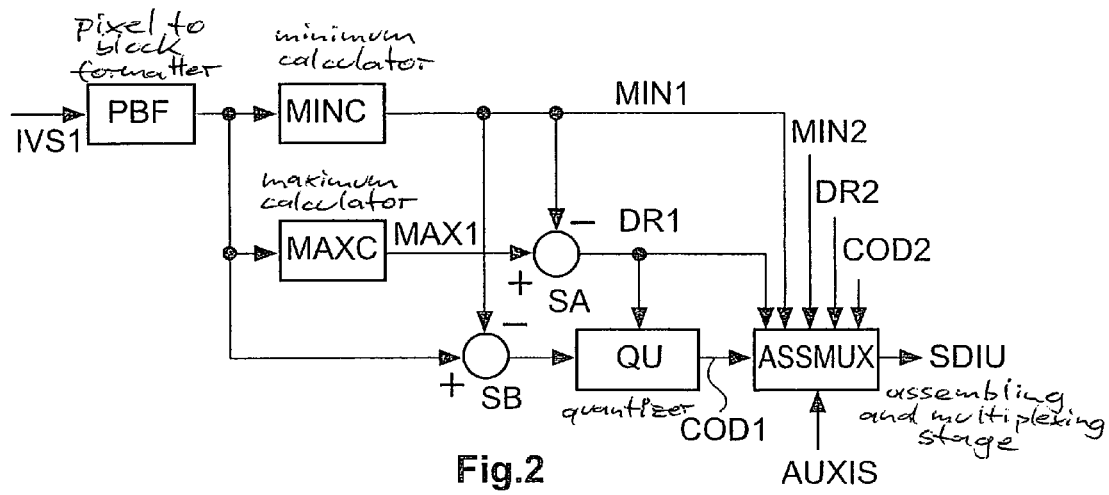
FIG. 2 encoder according to the invention.

In FIG. 2 the encoder receives a digital video input signal IVS1. In the PAL, SECAM and NTSC TV systems the active video portion of one video line has 720 pixels with 1440 components. These components are arranged in a multiplexed fashion: $C_b$-Y-$C_r$-Y-$C_b$-Y-$C_r$-Y- etc., wherein Y represents an e.g. 10-bit luminance sample, $C_b$ represents an e.g. 10-bit blue-component chrominance sample and $C_r$ represents a corresponding red-component chrominance sample. The possible amplitude values for every sample occupy a slightly limited range only within the 10-bit span in order to avoid interference with a Timing Reference Signal TRS.

Figure 7:
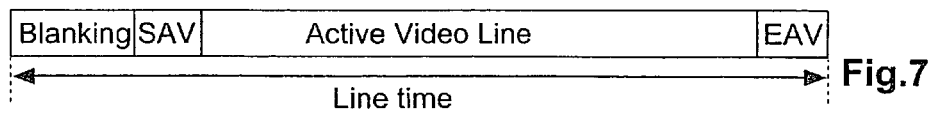
FIG. 7 sections of a complete line.

A corresponding video line is depicted in FIG. 7 and consists of the active video portion, a horizontal blanking section that can be used for embedding additional data and/or audio data, and a Start Active Video word SAV as well as an End Active Video word EAV. The inventive compression/decompression code replaces only the 1440 words of the active video line section.

Figure 8:
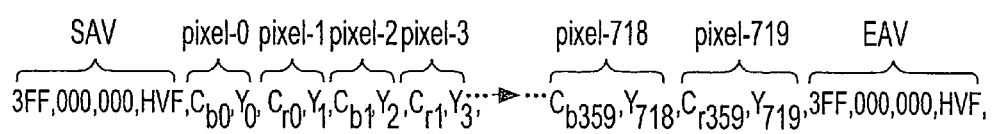
FIG. 8 components of a line.

The line arrangement is depicted in more detail in FIG. 8. The SAV and EAV sections each consist of four data word sections, each including the HVF word which is a part of the Timing Reference Signal TRS and which signals the start and stop of horizontal, vertical and frame pulses H, V and F, respectively. Some parity bits are also located in this HVF timing word allowing to check and correct HVF if necessary. The H-, V- and F-pulses represent the total timing of the picture.

How the lines are arranged as a PAL or SECAM picture frame is shown in FIG. 6. Blanking, SAV and EAV is present in every line. Field 1 and field 2 each contain in total 312.5 lines. The active portion of field 1 starts with half line 23 or full line 24 and ends with full line 310. The active portion of field 2 starts with full line 336 and ends with full line 622 or half line 623.

For NTSC, field 1 and field 2 each contain in total 262.5 lines. The active portion of field 1 starts with full line 21 and ends with full line 262 or half line 263. The active portion of field 2 starts with half line 283 or full line 284 and ends with full line 525. E.g. 19 lines before the start of the active fields 1 and 2 may contain optional video data.

One video line includes 720 Y, 360 $C_b$ and 360 $C_r$ samples. These components are compressed separately. Returning to FIG. 2, for each component groups or blocks including e.g. 16 successive samples are formed in a pixel-to-block formatter PBF, like Y0-Y1-Y2-Y3-Y4- . . . -Y15. From each current group the highest amplitude value MAX1 and the lowest amplitude value MIN1 is determined in a maximum calculator MAXC and a minimum calculator MINC, respectively. In a first subtractor SA the MIN1 value is subtracted from the MAX1 value thereby resulting in a dynamic range value DR1 for the current group. In a second subtractor SB the MIN1 value is subtracted from each one of the original sample amplitude values of the current group, which processing step can be considered as representing a normalization. The difference signal output values of subtractor SB are fed to a quantizer QU in which they are quantized under control of the current dynamic range value DR1 such that the quantizer output signal values COD1 occupy a pre-selected fixed amplitude range only, which amplitude range (e.g. 3, 4 or 5 bit) is smaller than that occupied by the original sample amplitude values (e.g. 8 or 10 bit).

The encoder contains a second part (not depicted) which basically corresponds to the first part described above. The first part processes e.g. the playback video signal IVS1 whereas the second part processes the teleprompter video signal IVS2. The second part generates corresponding output signals MIN2, DR2 and COD2. As an alternative, the input signals IVS1 and IVS2 are both processed in a single part in a multiplexed fashion.

The sample playback video signal amplitude differences output from SB are quantized to 4 bits in a 10-bit system, and for the TP signal to 4 bits (or 3 bits) in a 10-bit system. Because the minimum value MIN and the dynamic range value DR or the maximum value MAX for each group or block are required by the decoder, these values are also transmitted. A different bit from the two current 8-bit data words for MIN and DR, or for MIN and MAX, is assigned to the different compressed data words of the current group or block, i.e. the bits of these two values form a fifth bit of the play-back video signal data words and a fifth (or fourth) bit of the TP signal data words. Preferably, these additional bits are arranged at the beginning or at the end of the compressed playback signal data words and the compressed TP signal data words.

The signals MIN1, DR1, COD1, MIN2, DR2 and COD2, as well as any required or desired auxiliary input signals AUXIS are fed to an assembling and multiplexing stage ASSMUX which outputs a corresponding SDI data stream SDIU.

Figure 3:
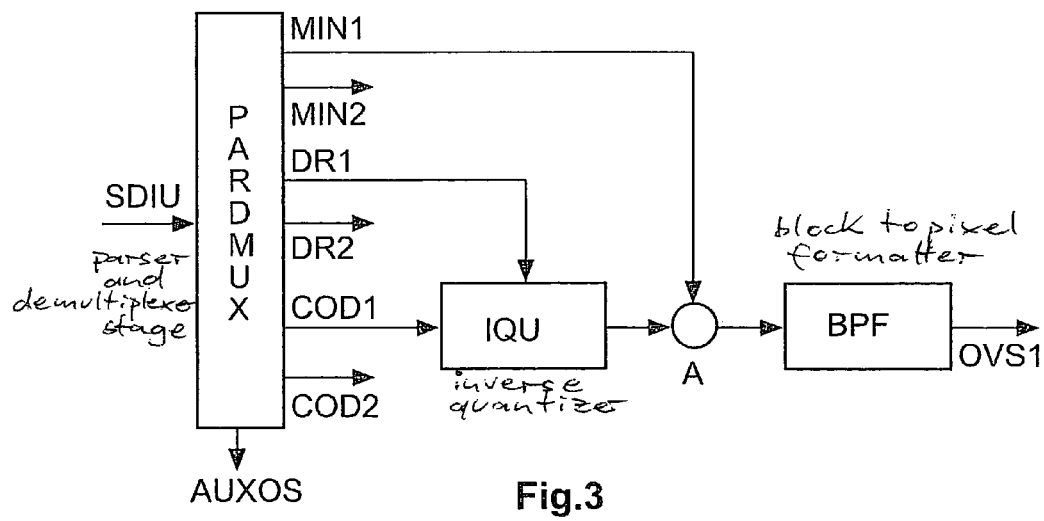
FIG. 3 decoder according to the invention.

In a corresponding decoder as shown in FIG. 3 signal SDIU enters a parser and demultiplexer stage PARDMUX which provides signals MIN1, DR1, COD1, MIN2, DR2 and COD2, as well as corresponding auxiliary output signals AUXOS. In a first part of the decoder signal COD1 is correspondingly inversely quantized in an inverse quantizer IQU under control of signal DR1. The output signal values of IQU are added in an adder A to the minimum values MIN1. The resulting reconstructed output signal samples can be fed to a block-to-pixel formatter BPF which outputs the output video signal OVS1, i.e. the pixel values of a line of the playback video signal. The corresponding second part (not depicted) of the decoder generates from the signals MIN2, DR2 and COD2 pixel values OVS2 of a line of the teleprompter video signal. Preferably, if a total or combined binary code word (i.e. TPS combined with PBS) in the combined video signal SDIU has a value that would lie in a forbidden range then e.g. the value '512' is added in assembling and multiplexing stage ASSMUX and the corresponding value '512' is subtracted in parser and demultiplexer stage PARDMUX.

Figure 4:
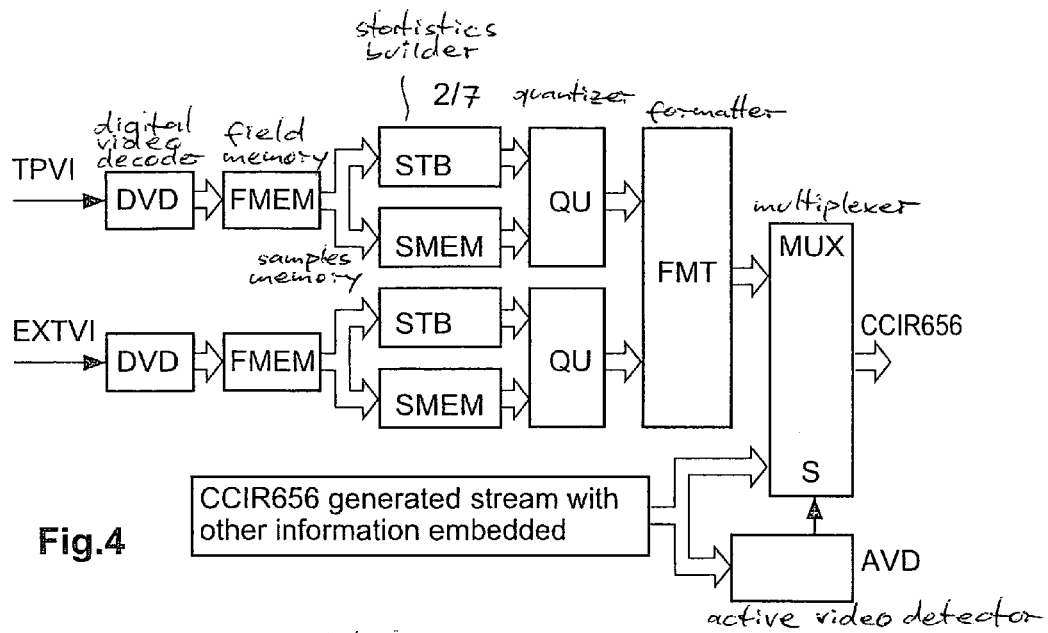
FIG. 4 block diagram of an encoder according to the invention.

As shown in a compression schematic overview in FIG. 4, an analog video input signal TPVI is applied to a digital video decoder DVD that generates a complete 8-bit CCIR656 (SMPTE 259) compliant digital video stream. Both field memories FMEM are needed for compensation in timing from the asynchronous input signal and for encoding. This timing is configured such that both 10-bit streams at the inputs of the multiplexer MUX are synchronous. The statistics builder STB corresponds to MINC, MAXC, SA and SB in FIG. 2. The samples memory SMEM corresponds to PBF in FIG. 2. The formatter FMT is included in block ASSMUX in FIG. 2. The select input of MUX is switched such that, using an active video detector AVD, only the active portion of the video line is replaced with the two compressed streams leaving other embedded data and information in the stream intact.

Figure 5:
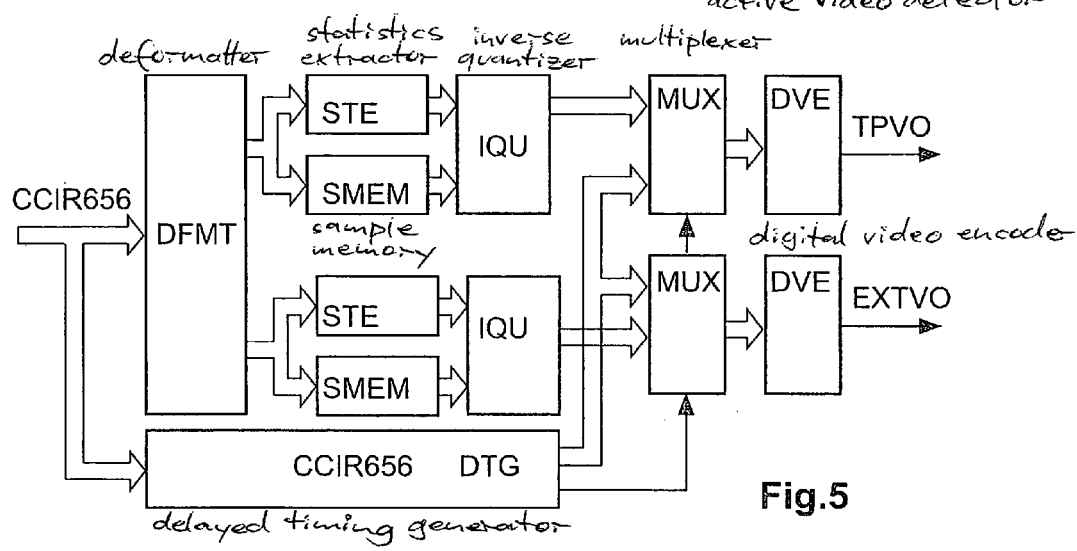
FIG. 5 block diagram of a decoder according to the invention.

As shown in a decompression schematic overview in FIG. 5, the received CCIR656 digital video stream can be directly connected to the deformatter DFMT. The statistics extractor STE and the sample memory SMEM are included in block PARDMUX in FIG. 3. The multiplier or inverse quantizer IQU in FIG. 5 corresponds to IQU in FIG. 3. At the deformatter's outputs two 5-bit streams are available for decompression. To input the correct format for the multiplexers MUX and the digital video encoders DVE, the timing is reconstructed using a delayed timing generator DTG.

Following compression and merging of the two streams in ASSMUX or FMT care must be taken that the resulting data words do not corrupt synchronization. In other words e.g. the values '0', '1', '1022' and '1023' must not occur.

In case a 5-bit and a 4-bit stream are merged one bit, e.g. the MSB, could be reserved for corruption prevention. If the constructed code words tend to get a value in the forbidden zone '0' and '1', '512' is added by e.g. setting the MSB to '1'.

However, thereby one half of the total range of 1024 values is consumed by corruption prevention. A more effective way of preventing timing corruption is to construct two 5-bit streams of which one occupies a full range of 32 values and the other one occupies only 31 values. The advantage is that only 32 values out of 1024 values are not used for video coding.

This is depicted in FIG. 9 in which in the five lower bits 32 values and in the five upper bits 31 values are used. The total range used here is 0 . . . 991 decimal 10-bit, but forbidden words '0' and '1' could occur.

If in the original compression processing values between '0' and '15' occur, '32' must be subtracted. Thereby the forbidden range '0' to '15' is shifted to the range 992 . . . 1007. Note that subtracting '32' is equivalent to adding 992 (=1024−32) since the sum will always be 10 bit with no parity.

Correspondingly, in the decompression processing it is checked whether there occur values in the range 992 . . . 1007. If that is true '32' will be added.

FIG. 8 gives a short overview of the sequence of the stored components per line in the 10-bit stream around SAV and EAV. For details see the above-mentioned SMPTE/ITU standards.

For each line the active video portion of the stream is now multiplexed into three separate streams:
Multiplexed Stream 1
Cb0, Cb1, Cb2, Cb3, . . . , Cb357, Cb358, Cb359
Multiplexed Stream 2
Cr0, Cr1, Cr2, Cr3, . . . , Cr357, Cr358, Cr359
Multiplexed stream 3
Y0, Y1, Y2, Y3, . . . , Y717, Y718, Y719
Per line, every multiplexed stream is partitioned into sample groups. Y is partitioned into 45 groups of 16 samples each, 45*16=720. Cb and Cr are both divided as 20 groups of 18 samples each, 20*18=360. These components add up to 720+2*360=1440 samples per line. The groups or blocks generated are:
(Cb0 . . . Cb17), (Cb18 . . . Cb35), (Cb36 . . . Cb53), etc.;
(Cr0 . . . Cr17), (Cr18 . . . Cr35), (Cr36 . . . Cr53), etc.;
(Y0 . . . Y15), (Y16 . . . Y31), (Y32 . . . Y47), (Y48 . . . Y63), etc.

All samples from any group are always treated as positive numbers only. From every group the highest and lowest values $G_{highest}$, $G_{lowest}$ are determined, both are 8-bit.

The highest minus the lowest value is the group range $G_{range} = G_{highest} - G_{lowest}$.

All the samples of the group are scaled to this group range and are quantized to the available levels. Available quantir levels for external-video is '15' and for teleprompter-video '14':

$$Q_{sample(i)} = (G_{sample(i)} - G_{lowest}) * (Q_{levels} - 1) / G_{range}.$$

FIG. 10 shows how a corresponding Y group block looks like following quantization.

FIG. 11 shows how a corresponding C group block looks like following quantization.

Y and C (i.e. Cb and Cr) are quantised using the same resolution for that channel. Each 5-bit channel is build as one bit for constructing the highest/lowest group values (or the lowest group value and the dynamic range value) and four bits for quantized values. Two bits in every C-group block can be left unused, or can be used as an additional data channel. Because the groups have different lengths the colour information for an Y group is taken from either one C group or from two adjacent C groups.

Advantageously, the reconstructed stream is arranged as a components multiplex the same way as defined in the above-mentioned SMPTE standard. The highest and lowest group values are sent bit-wise together with the quantized samples of that group. The arrangement of the highest and lowest group values in the reconstructed stream is like depicted in FIGS. 10 and 11. The MSB can be sent/received first. Preferably, the LSB or the MSB within the 5-bit playback signal data words and the LSB or the MSB within the 5-bit TP signal data words represent the values MIN1/MIN2 (lowest group value) and DR1/DR2 (dynamic range value) or MAX1/MAX2 (highest group value).

The encoding formula for external-video is:

$$Q_{sample(i)} = \text{Truncate}[((G_{sample(i)} - G_{lowest})*15)/G_{range} + 0.5]$$

The encoding formula for teleprompter-video is:

$$Q_{sample(i)} = \text{Truncate}[((G_{sample(i)} - G_{lowest})*14)/G_{range} + 0.5]$$

wherein $G_{range}$, $G_{lowest}$ and $G_{sample(i)}$ have values lying between '0' and '255'. $G_{sample(i)}$ is the sample taken from the original stream.

The decoding formula for external-video is:

$$\text{Sample}_{(i)\_reconstructed} = ((G_{highest} - G_{lowest})*Q_{(i)sample})/15 + G_{lowest}$$

The decoding formula for teleprompter-video is:

$$\text{Sample}_{(i)\_reconstructed} = ((G_{highest} - G_{lowest})*Q_{(i)sample})/14 + G_{lowest}$$

Figures 12, 13:
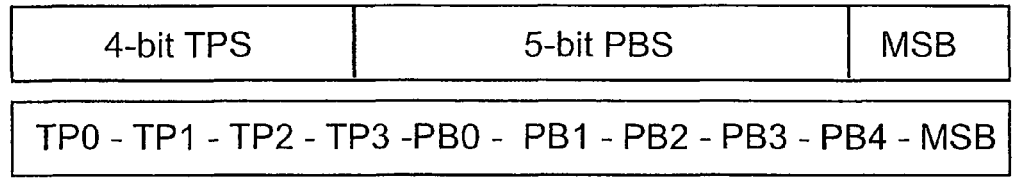
FIG. 12 second inventive bit arrangement in an SDI data word.
FIG. 13 initial steps in a compression program suitable for carrying out the invention.

As an alternative embodiment shown in FIG. 12, a 10-bit SDI stream data word can contain one 5-bit data word of the playback video signal PBS as well as one 4-bit data word of the teleprompter video signal TP. Thereby in the 10-bit SDI signal words one bit can remain unused, e.g. the MSB bit (most significant bit). That bit can be used to comply to the above-mentioned standards and to avoid TRS corruption. If a total or combined binary code word (i.e. TPS combined with PBS) in the combined video signal would get a value that is below '64' then the value '512' is added in assembling and multiplexing stage ASSMUX.

Preferably, bit PB0 or bit PB4 of the playback signal data words and bit TP0 or bit TP3 of the TP signal data words represent the values MIN1/MIN2 and DR1/DR2 or MAX1/MAX2.

Figure 15:
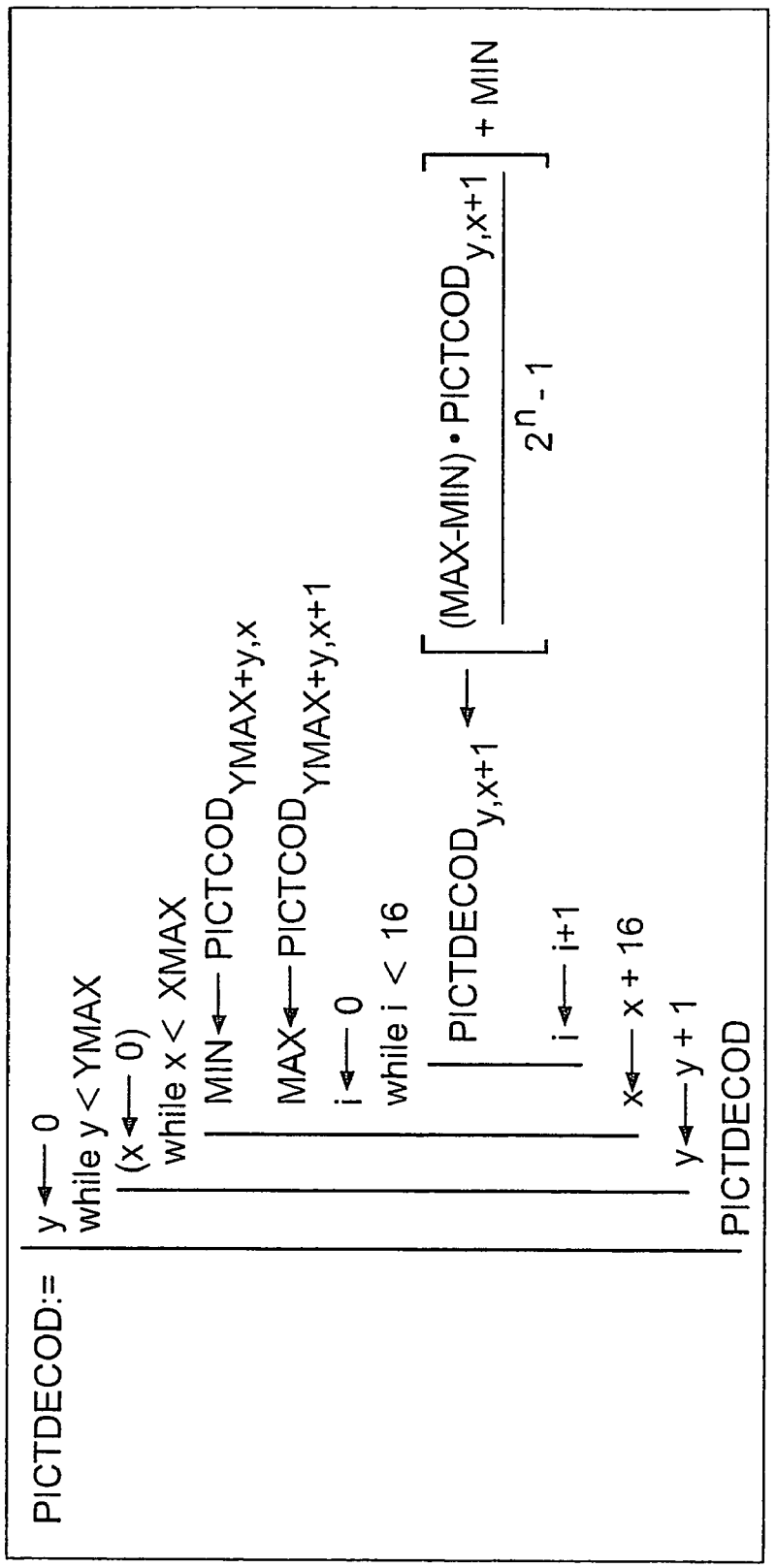
FIG. 15 decompression steps of a program suitable for carrying out the invention.
Figure 76:
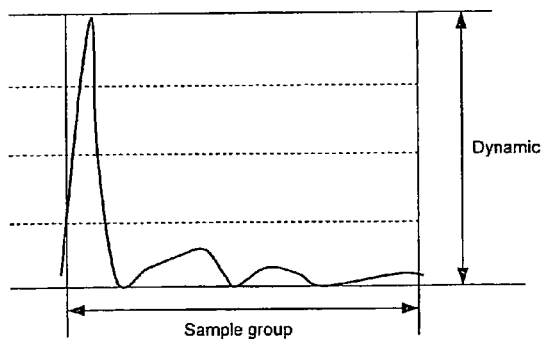
Figure 77:
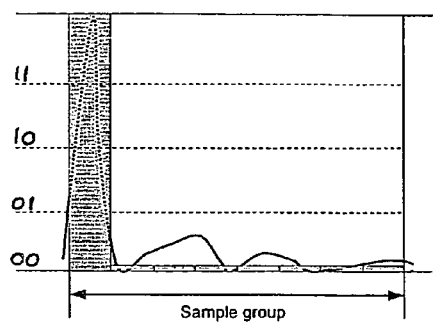
Figure 78:
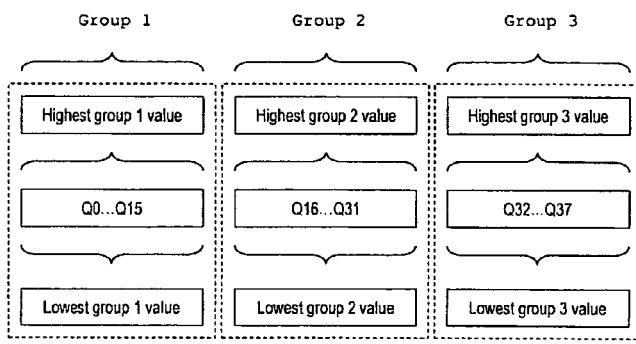
Figure 79:
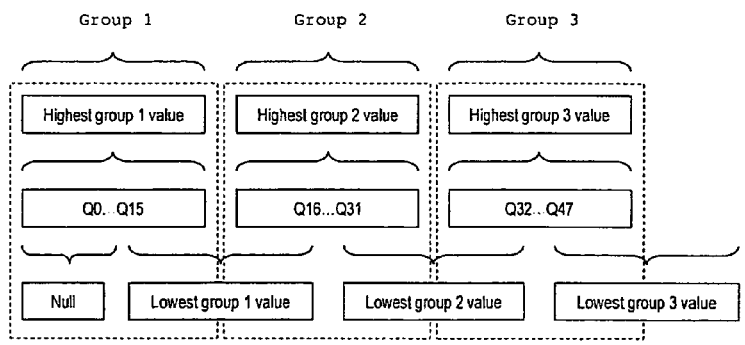

In FIG. 13 the initial steps in a compression program suitable for carrying out the invention are shown. In FIG. 14 the compression steps in a program suitable for carrying out the invention are shown. In FIG. 15 the decompression steps of a program suitable for carrying out the invention are shown.

The dynamic performance of the inventive ADRC processing can be improved by shifting lowest group values. This is explained in connection with FIGS. 16 to 19.

ADRC makes use of the property that in a small group of consecutive pixel values their amplitudes do not differ much from each other. Usually this is the case. Another approach is that in a small group of pixel values the dynamic amplitude range is small, the highest group sample value is close to the lowest group sample value.

However, if e.g. one sample in such group has a very low or high amplitude value in comparison with the other group samples, a visible column forming effect can occur. FIG. 16 and FIG. 17 show an example video signal in an 8-samples group using 2-bit quantization, i.e. quantization levels '00', '01', '10' and '11'. Because of the first much higher sample amplitude value the other samples are quantized to the lowest quantization level, i.e. they are set to the minimum value of this group. Thereby in the decoded signal, following quantization and inverse quantization, a column pattern would become visible.

The easiest way to deal with this situation would be to decrease the number of samples per group. But this would also increase the amount of data, i.e. the resulting data rate. An advantageous way to decrease column forming is to shift the lowest group values by half the group size.

For explaining this, the normal ADRC application is depicted first in FIG. 18. For instance, every group has 16 samples. Consider group 2. The highest and lowest sample values of group 2 are arranged in connection with, or are assigned to, samples S16 . . . S31 (or quantized sample values Q16 . . . Q31) as 'highest group2 value' and 'lowest group2 value'. At the decompression side, Q16 . . . Q31 are reconstructed with the aid of 'highest group2 value' and 'lowest group2 value'.

As shown in FIG. 19, the lowest group values can be shifted. In this example the lowest group value for samples S0 . . . S7 is considered to be 'null'. The lowest group1 value is arranged over the samples Q8 . . . Q23, the lowest group2 value over the samples Q24 . . . Q39, and the lowest group3 value over the samples Q40 . . . Q55.

Again, consider the samples of group 2, S16 . . . S31. The samples S16 . . . S23 are quantized using the highest group2 value and the lowest group1 value, whereas the samples S24 . . . S31 are quantized using highest group2 value and lowest group2 value.

At the decoder the same highest and lowest group values are used as at the encoder.

Advantageously, due to using shifted lowest group values the above-described column artefact effect can be reduced significantly.

The numbers given in this description, e.g. the word lengths, can be adapted to different applications of the invention as required.

What is claimed is:

1. Method for encoding a first and a second digital video signal using compression, samples of each signal having a pre-selected original word length, into a combined video signal having code words of which have a pre-selected main word length that is smaller than two times said original word length, said method including the steps:

from lines of said first and second video signals, successively forming sample blocks for a luminance component and for two different chrominance components of each one of said first and second video signals;

determining the minimum and the maximum amplitude values in a current sample block;

in said current sample block, subtracting said minimum amplitude value from every sample in said current sample block and quantizing the resulting difference values such that the word length of the quantized difference values gets a pre-selected first word length for the quantized difference values of said first video signal and gets a pre-selected second word length for the quantized difference values of said second video signal, wherein said first and second word lengths can be different, and whereby said quantizing is controlled by a dynamic range value in said current sample block, said dynamic range value representing the difference between said maximum amplitude value and said minimum amplitude value in said current sample block;

assembling, for a current data block of said combined video signal, each quantized difference value of said first and second video signals such that the bits of a quantized difference value of said first video signal form lower bit positions of a data word of said combined video signal and the bits of a corresponding quantized difference value of said second video signal form upper bit positions of a data word of said combined video signal, said upper bit positions being arranged adjacent to said lower bit positions, whereby the bits of the data words for said minimum amplitude value and said dynamic range value of said current data block, or for said minimum amplitude value and said maximum amplitude value of said current data block, each form one bit per data word of said quantized difference values of said first and second video signals;

successively outputting data words assembled in such way as said combined video signal.

2. Method according to claim 1 wherein said combined video signal is fed from a base unit to a camera unit.

3. Method according to claim 1, wherein said combined video signal has a format of a standardised-format single video signal having a data word length of 10 bits.

4. Method according to claim 3, wherein said combined video signal fed from said base unit to said camera unit has a 270 Mbit SDI format and wherein the camera output video signal is fed from said camera unit to said base unit as a 10-bit 270 Mbit SDI format signal.

5. Method according to claim 4, wherein said first video signal is a teleprompter signal to the code words of which a length of 5 bits is assigned but from the resulting 32 possible values of which only 31 values are used, said length including the bit assigned to said minimum amplitude value and said dynamic range value or said maximum amplitude value, respectively, and wherein said second video signal is a playback signal to the code words of which a length of 5 bits is assigned and from the resulting 32 possible values of which 32 values are used, said length including the bit assigned to said minimum amplitude value and said dynamic range value or said maximum amplitude value, respectively.

6. Method according to claim 5 wherein, if in said encoding a combined binary code word in said combined video signal would get a value in a forbidden range '0' to '15', the value '32' is subtracted or the value '992' is added, and in the corresponding decoding the value '32' is added or the value '992' is subtracted if a received value is in the range '992' to '1007'.

7. Method according to claim 4, wherein said first video signal is a teleprompter signal to the code words of which a length of 4 bits is assigned, said length including the bit assigned to said minimum amplitude value and said dynamic range value or said maximum amplitude value, respectively, and wherein said second video signal is a playback signal to the code words of which a length of 5 bits is assigned, said length including the bit assigned to said minimum amplitude value and said dynamic range value or said maximum amplitude value, respectively.

8. Method according to claim 7, wherein in the 10-bit SDI signal words the MSB bit remains unused, and if a combined binary code word in said combined video signal would get a value that is below '64' then the value '512' is added when encoding, or is correspondingly subtracted when decoding.

9. Method according to claim 1, wherein the number of quantized difference values arranged in a current luminance component data block is different from the number of quantized difference values arranged in a current chrominance component data block.

10. Method according to claim 1 wherein, instead of one, two minimum amplitude values in a current sample block are determined separately for a left part of adjacent samples of the current sample block together with a right part of adjacent samples of the sample block adjacent to the left and for a right part of adjacent samples of the current sample block together with a left part of adjacent samples of the sample block adjacent to the right, and wherein in said current sample block, said first and second minimum amplitude values are subtracted from every corresponding sample in said current sample block before said quantizing;

and wherein a given one of said two minimum vales is assembled for a current data block.

11. Method for decoding a combined video signal including two compressed video signals into a first and a second digital video signal, the samples of each signal having a pre-selected original word length, whereby code words of said combined video signal have a pre-selected main word length that is smaller than two times said original word length, said method including the steps:

parsing code words of said combined video signal, so as to regain from pre-selected lower bit positions—representing a first word length of each one of said code words—the bits of quantized difference values of said first video signal and from pre-selected upper bit positions—representing a second word length of corresponding ones of said code words—the bits of corresponding quantized difference values of said second video signal, said upper bit positions being arranged adjacent to said lower bit positions, wherein said first and second word lengths can be different, and to regain data words for a minimum amplitude value and a dynamic range value, or for a minimum amplitude value and a maximum amplitude value, of a current data block of said first and of said second digital video signal, whereby the bits of the data words for said minimum amplitude value and said dynamic range value or said maximum amplitude value, respectively, of said current data block each form one bit per code word of said quantized difference values of said first and second video signals, and whereby said dynamic range value represents the difference between said maximum amplitude value and said minimum amplitude value in said current data block;

in said current data block, inversely quantizing said quantized difference values under control of said dynamic range value and adding said minimum amplitude value to each one of said inversely quantized difference values, whereby the word length of the correspondingly combined values gets said pre-selected original word length for said first video signal and said second video signal;

from successive data blocks, forming and outputting sample words for lines of a luminance component and two different chrominance components of each one of said first and second video signals.

12. Method according to claim 11, wherein said combined video signal is fed from a base unit to a camera unit.

13. Method according to claims 11, wherein said combined video signal has a format of a standardised-format single video signal signal having a data word length of 10 bits.

14. Method according to claim 13, wherein said combined video signal fed from said base unit to said camera unit has a 270 Mbit SDI format and wherein the camera output video signal is fed from said camera unit to said base unit as a 10-bit 270 Mbit SDI format signal.

15. Method according to claim 14, wherein said first video signal is a teleprompter signal to the code words of which a length of 5 bits is assigned but from the resulting 32 possible values of which only 31 values are used, said length including the bit assigned to said minimum amplitude value and said dynamic range value or said maximum amplitude value, respectively, and wherein said second video signal is a playback signal to the code words of which a length of 5 bits is assigned and from the resulting 32 possible values of which 32 values are used, said length including the bit assigned to said minimum amplitude value and said dynamic range value or said maximum amplitude value, respectively.

16. Method according to claim 15 wherein, if in said encoding a combined binary code word in said combined video signal would get a value in a forbidden range '0' to '15', the value '32' is subtracted or the value '992' is added, and in the corresponding decoding the value '32' is added or the value '992' is subtracted if a received value is in the range '992' to '1007'.

17. Method according to claim 14, wherein said first video signal is a teleprompter signal to the code words of which a length of 4 bits is assigned, said length including the bit assigned to said minimum amplitude value and said dynamic range value or said maximum amplitude value, respectively, and wherein said second video signal is a playback signal to the code words of which a length of 5 bits is assigned, said length including the bit assigned to said minimum amplitude value and said dynamic range value or said maximum amplitude value, respectively.

18. Method according to claim 17, wherein in the 10-bit SDI signal words the MSB bit remains unused, and if a combined binary code word in said combined video signal would get a value that is below '64' then the value '512' is added when encoding, or is correspondingly subtracted when decoding.

19. Method according to claim 11, wherein the number of quantized difference values arranged in a current luminance component data block is different from the number e.g. 18 of quantized difference values arranged in a current chrominance component data block.

20. Method according to claim 11 wherein, when encoding, two minimum amplitude values in a current sample block were determined separately
for a left part of adjacent samples of the current sample block together with a right part of adjacent samples of the sample block adjacent to the left and
for a right part of adjacent samples of the current sample block together with a left part of adjacent samples of the sample block adjacent to the right,
and wherein in said current sample block, said first and second minimum amplitude values were subtracted from every corresponding sample in said current sample block before said quantizing,
and wherein a given one of said two minimum vales was assembled for a current data block,
and wherein in decoding, when adding said minimum amplitude value to each one of said inversely quantized difference values, the corresponding one of said two minimum amplitude values is used therefore.

21. Apparatus for encoding a first and a second digital video signal, samples of each signal having a pre-selected original word length, into a combined video signal having code words which have a pre-selected main word length that is smaller than two times said original word length, said apparatus including:
means being adapted for forming successively, from lines of said first and second video signals, sample blocks for a luminance component and for two different chrominance components of each one of said first and second video signals;
means being adapted for determining the minimum and the maximum amplitude values in a current sample block;
means being adapted for subtracting, in said current sample block, said minimum amplitude value from every sample in said current sample block;
means being adapted for quantizing the resulting difference values such that the word length of the quantized difference values gets a pre-selected first word length for the quantized difference values of said first video signal and gets a pre-selected second word length for the quantized difference values of said second video signal, wherein said first and second word lengths can be different, and whereby said quantizing is controlled by a dynamic range value in said current sample block, said dynamic range value representing the difference between said maximum amplitude value and said minimum amplitude value in said current sample block;
means being adapted for assembling, for a current data block of said combined video signal, each quantized difference value of said first and second video signals such that the bits of a quantized difference value of said first video signal form lower bit positions of a data word of said combined video signal and the bits of a corresponding quantized difference value of said second video signal form upper bit positions of a data word of said combined video signal, said upper bit positions being arranged adjacent to said lower bit positions, whereby the bits of the data words for said minimum amplitude value and said dynamic range value of said current data block, or for said minimum amplitude value and said maximum amplitude value of said current data block, each form one bit per data word of said quantized difference values of said first and second video signals;
and for successively outputting data words assembled in such way as said combined video signal.

22. Apparatus according to claim 21, wherein said combined video signal is fed from a base unit to a camera unit and has a format of a standardised-format single video signal having a data word length of 10 bits.

23. Apparatus according to claim 22, wherein said combined video signal fed from said base unit to said camera unit has a 270 Mbit SDI format and wherein the camera output video signal is fed from said camera unit to said base unit as a 10-bit 270 Mbit SDI format signal.

24. Apparatus according to claim 23, wherein said first video signal is a teleprompter signal to the code words of which a length of 5 bits is assigned but from the resulting 32 possible values of which only 31 values are used, said length including the bit assigned to said minimum amplitude value and said dynamic range value or said maximum amplitude value, respectively, and wherein said second video signal is a playback signal to the code words of which a length of 5 bits is assigned and from the resulting 32 possible values of which 32 values are used, said length including the bit assigned to said minimum amplitude value and said dynamic range value or said maximum amplitude value, respectively.

25. Apparatus according to claim 24 wherein, if in said encoding a combined binary code word in said combined video signal would get a value in a forbidden range '0' to '15', the value '32' is subtracted or the value '992' is added, and in the corresponding decoding the value '32' is added or the value '992' is subtracted if a received value is in the range '992' to '1007'.

26. Apparatus according to claim 23, wherein said first video signal is a teleprompter signal to the code words of which a length of 4 bits is assigned, said length including the bit assigned to said minimum amplitude value and said dynamic range value or said maximum amplitude value, respectively, and wherein said second video signal is a playback signal to the code words of which a length of 5 bits is assigned, said length including the bit assigned to said minimum amplitude value and said dynamic range value or said maximum amplitude value, respectively.

27. Apparatus according to claim 26, wherein in the 10-bit SDI signal words the MSB bit remains unused, and if a combined binary code word in said combined video signal would get a value that is below '64' then the value '512' is added when encoding, or is correspondingly subtracted when decoding.

28. Apparatus according to claim 21, wherein the number of quantized difference values arranged in a current luminance component data block is different from the number of quantized difference values arranged in a current chrominance component data block.

29. Apparatus according to claim 21 wherein, instead of one, two minimum amplitude values in a current sample block are determined separately for a left part of adjacent samples of the current sample block together with a right part of adjacent samples of the sample block adjacent to the left and for a right part of adjacent samples of the current sample block together with a left part of adjacent samples of the sample block adjacent to the right, and wherein in said current sample block, said first and second minimum amplitude values are subtracted from every corresponding sample in said current sample block before said quantizing;

and wherein a given one of said two minimum vales is assembled for a current data block.

30. Apparatus for decoding a combined video signal including two compressed video signals into a first and a second digital video signal, samples of each signal having a pre-selected original word length, whereby code words of said combined video signal have a pre-selected main word length that is smaller than two times said original word length, said apparatus including:

means being adapted for parsing code words of said combined video signal, so as to regain from pre-selected lower bit positions—representing a first word length of each one of said code words—the bits of quantized difference values of said first video signal and from pre-selected upper bit positions—representing a second word length of corresponding ones of said code words—the bits of corresponding quantized difference values of said second video signal, said upper bit positions being arranged adjacent to said lower bit positions, wherein said first and second word lengths can be different, and to regain data words for a minimum amplitude value and a dynamic range value, or for a minimum amplitude value and a maximum amplitude value, of a current data block of said first and of said second digital video signal, whereby the bits of the data words for said minimum amplitude value and said dynamic range value or said maximum amplitude value, respectively, of said current data block each form one bit per code word of said quantized difference values of said first and second video signals, and whereby said dynamic range value represents the difference between said maximum amplitude value and said minimum amplitude value in said current data block;

means being adapted for inversely quantizing, in said current data block, said quantized difference values under control of said dynamic range value and adding said minimum amplitude value to each one of said inversely quantized difference values, whereby the word length of the correspondingly combined values gets said pre-selected original word length for said first video signal and said second video signal;

means being adapted for forming and outputting, from successive data blocks, sample words for lines of a luminance component and two different chrominance components of each one of said first and second video signals.

31. Apparatus according to claims 30, wherein said combined video signal is fed from a base unit to a camera unit and has a format of a standardised-format single video signal, having a data word length of 10 bits.

32. Apparatus according to claim 31, wherein said combined video signal fed from said base unit to said camera unit has a 270 Mbit SDI format and wherein the camera output video signal is fed from said camera unit to said base unit as a 10-bit 270 Mbit SDI format signal.

33. Apparatus according to claim 32, wherein said first video signal is a teleprompter signal to the code words of which a length of 5 bits is assigned but from the resulting 32 possible values of which only 31 values are used, said length including the bit assigned to said minimum amplitude value and said dynamic range value or said maximum amplitude value, respectively, and wherein said second video signal is a playback signal to the code words of which a length of 5 bits is assigned and from the resulting 32 possible values of which 32 values are used, said length including the bit assigned to said minimum amplitude value and said dynamic range value or said maximum amplitude value, respectively.

34. Apparatus according to claim 33 wherein, if in said encoding a combined binary code word in said combined video signal would get a value in a forbidden range '0' to '15', the value '32' is subtracted or the value '992' is added, and in the corresponding decoding the value '32' is added or the value '992' is subtracted if a received value is in the range '992' to '1007'.

35. Apparatus according to claim 32, wherein said first video signal is a teleprompter signal to the code words of which a length of 4 bits is assigned, said length including the bit assigned to said minimum amplitude value and said dynamic range value or said maximum amplitude value, respectively, and wherein said second video signal is a playback signal to the code words of which a length of 5 bits is assigned, said length including the bit assigned to said minimum amplitude value and said dynamic range value or said maximum amplitude value, respectively.

36. Apparatus according to claim 35, wherein in the 10-bit SDI signal words the MSB bit remains unused, and if a combined binary code word in said combined video signal would get a value that is below '64' then the value '512' is added when encoding, or is correspondingly subtracted when decoding.

37. Apparatus according to claim 30, wherein the number of quantized difference values arranged in a current luminance component data block is different from the number of quantized difference values arranged in a current chrominance component data block.

38. Apparatus according to claim 30 wherein, when encoding, two minimum amplitude values in a current sample block were determined separately for a left part of adjacent samples of the current sample block together with a right part of adjacent samples of the sample block adjacent to the left and for a right part of adjacent samples of the current sample block together with a left part of adjacent samples of the sample block adjacent to the right, and wherein in said current sample block, said first and second minimum amplitude values were subtracted from every corresponding sample in said current sample block before said quantizing, and wherein a given one of said two minimum vales was assembled for a current data block, and wherein in decoding, when adding said minimum amplitude value to each one of said inversely quantized difference values, the corresponding one of said two minimum amplitude values is used therefore.

\* \* \* \* \*